Dec. 5, 1950 — A. M. KELLAM — 2,532,773
QUICK-DISCONNECT DUCT JOINT
Filed Aug. 15, 1947
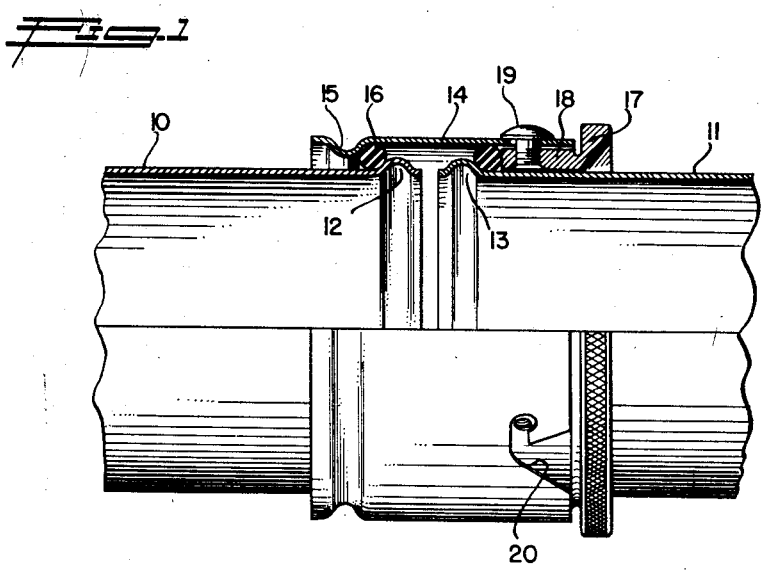
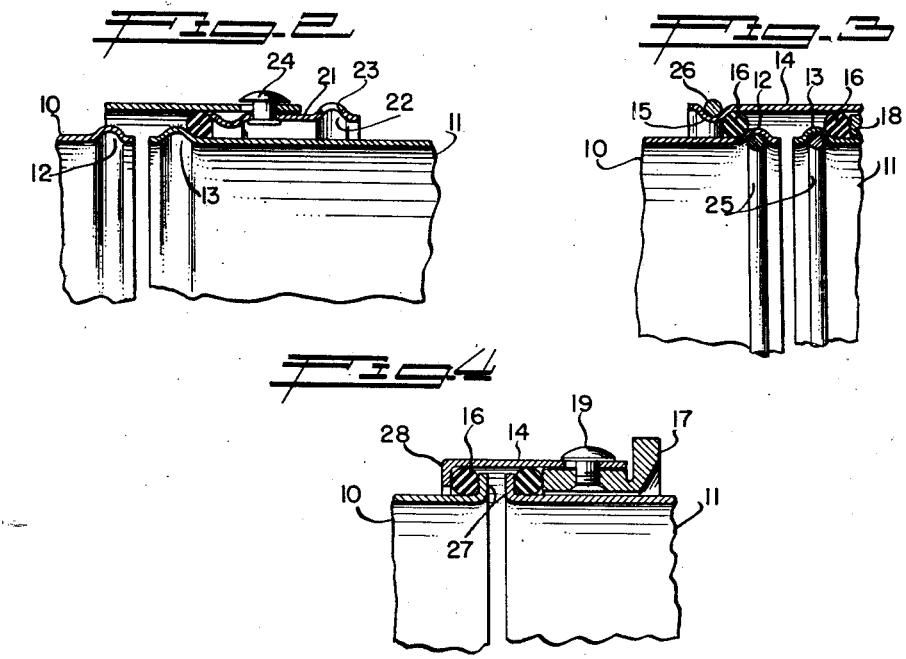
INVENTOR
ARTHUR M. KELLAM
By George A Sullivan
Agent Patented Dec. 5, 1950

2,532,773

UNITED STATES PATENT OFFICE 2,532,773

QUICK-DISCONNECT DUCT JOINT

Arthur M. Kellam, Tujunga, Calif., assignor to Lockheed Aircraft Corporation, Burbank, Calif.

Application August 15, 1947, Serial No. 768,783

5 Claims. (Cl. 285—193)

1

The present invention relates to an improved and simplified quick-disconnect joint for ducts and other fluid conduits, embodying means for flexibly engaging and sealing adjacent ends of such ducts to permit ready disconnection and re-assembly of joints in sectional tubes, ducts and conduits conveying fluids under either negative or positive pressures.

Fluid ducts or conduits of the type under consideration, which may connect a blower or supercharger to an engine induction system or to a pressurized cabin in airplanes for example, desirably have several quick-disconnect joints that are broken to permit either the removal of equipment at either end of the complete duct or the removal of an intermediate section of duct to facilitate access to or removal of parts of the airplane.

Small and medium sized duct-joints have heretofore been provided with a hose-like rubber sleeve attached to the opposed duct ends by hose clamps, similar to automobile radiator hose connections; but as duct sizes become larger such hose connections become unwieldy.

It is accordingly an object of this invention to provide an improved and simplified quick-detachable coupling or joint for fluid ducts and the like subject to either negative or positive pressures, wherein the coupling is readily connected and disconnected and is self-sealing without being sensitive to precision as to the length or alignment of the duct sections to be joined.

It is a further object of this invention to provide an improved joint of the class described eliminating any metal to metal contacts limiting relative movement or bending of the adjacent duct sections, and in which resilient O rings provide unbalanced area sealing, which unbalanced sealing also renders the joint self locking under internal pressure.

It is another object of this invention to provide a simple and reliable joint of the class described having a minimum number of parts, none of which are loose and, therefore, may become lost when the joint is disconnected.

The above and other objects and advantages of this invention will become evident as the description of the invention proceeds.

In the drawings:

Figure 1 is a partly sectioned joint between two duct sections embodying one form of my coupling or joint;

Figure 2 is a fragmentary section corresponding to Figure 1 and showing a modified form of

2 locking collar suitable for low and moderate pressure service;

Figure 3 is a section of another modification wherein the duct and sleeve beads have been reinforced for large and/or high pressure ducts; and Figure 4 is a section of a further modification wherein duct flanges are utilized instead of beads.

As shown in the several illustrations, the basic problem with which my invention is concerned is to provide a quickly detachable coupling to resiliently connect and seal the joint between the contiguous ends of two sections of ducts or tubes. For convenience, the adjacent sections of ducts or tubes will be referred to as 10 and 11 for the several modifications disclosed. In Figures 1 to 3, each duct end has outstanding peripheral beads 12 and 13 rolled thereinto. The duct ends preferably have no contact with each other and in practice may be found slightly offset or misaligned prior to coupling them together. The duct end spacing and misalignment is not critical within reasonable limits, as the coupling or joint to be now described will absorb such variations as well as permit some relative motion in service, thus avoiding the transmission of vibrations from one section to another.

As shown in Figure 1, the longitudinally spaced and substantially aligned ends of the duct sections 10 and 11 have a concentric sleeve 14 positioned thereover, the sleeve having an inturned bead 15 rolled therein. While the position of the sleeve and bead can be reversed to facilitate access to the joint, I have shown the bead as overlying the duct section 10 with the sleeve bead 15 on the duct side of the duct bead 12.

A resilient rubber-like ring 16 is positioned on the duct side of each of the duct beads, these rings being commonly referred to as O rings and being commercially available in a large number of sizes and compositions suitable for various fluids and operating temperatures. These O rings require a small amount of circumferential distortion for effective sealing so that the inner diameter of this sleeve 14 is slightly less than the outer diameter of the O ring when in position on the duct, to produce a radial squeeze on the O ring.

The beads 12 and 15 are longitudinally spaced to accommodate the O ring. This spacing is not critical as adequate sealing is obtained when the O ring is in contact with either bead. Where positive pressures are present in the ducts the O ring will normally contact the sleeve bead 15, whereas when negative pressures exist in the ducts the O ring may rest against the duct bead 12. Considerable longitudinal clearances between the O ring and either of the beads 12 and 15 are permissible so that exact mating of the duct section ends is not required and either duct section may expand or contract without affecting the seal.

A collar 17 is provided which has some diametrical clearance relative to the duct end 11, this collar having a portion 18 sliding into the right end of the sleeve 14 to form an abutment for the second O ring 16 positioned to the right of the bead 13 on the duct 11. If the ducts are circular, it is convenient to use a rotary type of bayonet lock comprising screws 19 on the collar and bayonet slots 20 in the sleeve, staking the screws in place in the collar, but if the duct is non-circular the screws may be removable and the bayonet slot omitted in the sleeve, since the collar would then be moved straight in and out of engagement with the sleeve.

The solid or machined collar 17 of Figure 1 can be replaced with a formed tubular collar 21, as shown in Figure 2, for moderate pressure service, in which case a peripheral bead 22 is formed and provided with holes 23 to engage with a spanner wrench for locking or unlocking the bayonet joint with the sleeve 14. A rivet 24 may be used in the place of the screw 19 shown in Figure 1.

For very large and/or high pressure ducts it may be desirable to reinforce the beads 12, 13 and 15 as by internal snap-rings 25 and an external welded ring 26 as shown in Figure 3.

While I have referred to beads rolled into the wall of the ducts and sleeve in the preceding description, it is to be understood that this is a convenient way of forming abutments for the O rings 16. If desired, the duct and sleeve ends may be flared or flanged as indicated at 27 and 28 in Figure 4. In either case only one of the opposed abutments need contact the O ring 16 in order to provide a sealed joint.

The several modifications described prevent metal to metal contact between the duct sections and the sleeve so that either duct is free to work relative to the other or the sleeve without transmission of vibrations to the other duct. The O rings increase the effectiveness and self-locking tendency of the connection or joint as pressure differentials increase due either to positive or negative pressures, since the unbalanced areas of the rings are exposed to a pressure differential. The abutments prevent the rings from blowing out yet yield to duct movements without leakage.

It will thus be seen that I have invented an improved and simplified quick-disconnect joint for fluid ducts and the like that is adaptable to a wide range of requirements and services. Accordingly, various changes in the details of construction may be made to suit such requirements without departing from the scope of the invention as set forth in the appended claims.

I claim as my invention:

1. A flexible quick-disconnect coupling for joints in fluid ducts or the like wherein the adjacent duct ends are provided with peripheral beads, said coupling comprising a sleeve telescoping over one of the duct ends, said sleeve having an inturned bead disposed on the duct side of the duct bead, an O ring disposed between the duct bead and the sleeve bead, a collar slidably carried by the other duct on the duct side of the duct bead, an O ring disposed between said collar and its duct bead, and means for releasably engaging said collar to said sleeve to couple the ducts together.

2. A quick-disconnect coupling of the type described for joining contiguous ends of ducts and the like subjected to fluid pressure, said duct ends being formed with peripheral beads, in combination with a radially spaced outer sleeve telescoping over the bead on one of said duct ends, said sleeve having an inturned bead positioned on the duct side of the duct bead, a collar slidable on the other duct end on the duct side of the duct bead, means for interlocking said collar to said sleeve and resilient packing rings disposed between both the sleeve bead and the collar and the respective duct beads.

3. A quick-disconnect coupling for ducts and the like comprising in combination with adjacent duct ends having peripheral beads, a coupling sleeve disposed over both duct ends and telescopingly retractable on one of said duct ends, a locking collar engageable with said sleeve, said sleeve and collar having means overlying both duct end beads, and resilient sealing rings disposed between said means and each of the duct end beads.

4. A quick-disconnect coupling for ducts and the like comprising in combination with adjacent duct ends formed to produce outstanding peripheral abutments, resilient sealing rings disposed on the duct sides of said duct abutments, and a two-part sleeve engaging over both duct ends and having means positioned on the duct sides of both duct abutments adapted to form internal abutments engaging the duct sides of said sealing rings whereby to engage each sealing ring between its sleeve abutment and its duct abutment.

5. A quick-disconnect coupling for ducts and the like comprising in combination with adjacent duct ends formed to produce outstanding peripheral abutments, separate resilient sealing rings disposed on the duct sides of each of said duct abutments, and sleeve-like coupling means enveloping said sealing rings and having internal abutments engaging the duct sides of said sealing rings, one of said abutments being axially disengageable from said tubular coupling means to disconnect said coupling, whereby to confine the sealing contacts between the coupling means and the duct ends to compression of the resilient sealing rings.

ARTHUR M. KELLAM.

REFERENCES CITED

The following references are of record in the file of this patent:

UNITED STATES PATENTS

| Number | Name | Date |
| --- | --- | --- |
| 1,022,759 | Stine | Apr. 9, 1912 |
| 1,063,996 | Moore | June 10, 1913 |
| 1,357,892 | Nelson | Nov. 2, 1920 |
| 1,910,152 | Durfey | May 23, 1933 |
| 2,215,659 | Bacon | Sept. 24, 1940 |
| 2,277,990 | Lanninger | Mar. 31, 1942 |
| 2,294,160 | Crane et al. | Aug. 25, 1942 |
| 2,395,745 | King | Feb. 26, 1946 |
| 2,426,423 | Woolsey | Aug. 26, 1947 |
| 2,438,529 | Woodling | Mar. 30, 1948 |

FOREIGN PATENTS

| Number | Country | Date |
| --- | --- | --- |
| 357,535 | France | Nov. 14, 1905 |